United States Patent [19]

Morris et al.

[11] Patent Number: 5,456,425
[45] Date of Patent: Oct. 10, 1995

[54] MULTIPLE PINTLE NOZZLE PROPULSION CONTROL SYSTEM

[75] Inventors: Joseph W. Morris, Rancho Cordova; Russell W. Carlson, Folsom; Kevin L. Peterson, Sacramento; Edward M. Reich, Orangevale, all of Calif.

[73] Assignee: Aerojet General Corporation, Sacramento, Calif.

[21] Appl. No.: 147,591

[22] Filed: Nov. 4, 1993

[51] Int. Cl.⁶ .................................................. F42B 15/00
[52] U.S. Cl. ............................................................ 244/3.22
[58] Field of Search .............................. 244/3.22, 52, 74; 60/242, 254

[56] References Cited

U.S. PATENT DOCUMENTS

| | | | |
|---|---|---|---|
| 3,599,899 | 8/1971 | McCullough | 244/3.22 |
| 3,948,042 | 4/1976 | Beardsley et al. | 60/242 |

FOREIGN PATENT DOCUMENTS

| | | |
|---|---|---|
| 659758 | 7/1977 | United Kingdom . |
| 1480723 | 10/1991 | United Kingdom . |

*Primary Examiner*—Daniel T. Pihulic
*Attorney, Agent, or Firm*—Towsend and Townsend Khourie and Crew

[57] ABSTRACT

A rocket motor assembly is provided with multiple pintle nozzles and a controller for adjusting the pintle position in the nozzles to generate a thrust differential, while maintaining the combustion pressure at equilibrium pressure by maintaining the sum of the throat areas of all of the pintle nozzles constant, for example. In this manner, proportional thrust control and very high response times are achieved. The controller also includes a pressure correction circuit that senses any difference between the actual combustion chamber pressure and the selected equilibrium pressure upon which the thrust differential was based, converts that to an error value, and sends a command signal to each pintle actuator so that each pintle position is adjusted an equal amount to compensate for the sensed pressure difference and maintain the combustion chamber pressure at the selected equilibrium pressure.

8 Claims, 6 Drawing Sheets

MULTIPLE PINTLE NOZZLE PROPULSION CONTROL SYSTEM

BACKGROUND OF THE INVENTION

The invention relates to a multiple nozzle propulsion control system generally, and more particularly to such a propulsion control system that provides high response proportional control of rocket motor jets suitable for use in aerospace vehicles such as SDI-type kinetic kill vehicles and air-to-air missiles.

While fins are currently the most commonly used method of controlling aerospace vehicles, newer systems are expected to use reaction jet controls because of potentially increased maneuverability and high altitude requirements. These systems typically comprise "bang-bang" (on-off) control schemes based on the operation of either movable poppet valves or fluidic diverter valves. Control is accomplished by driving these valves in either a thrust pulse duration modulation (PDM) or pulse width modulation (PWM) mode to achieve thrust modulation. In both cases, extremely high response valves are required. Accuracy of these systems is very dependent on valve response. In addition, the resulting thrust is in the form of high frequency pulses which have undesirable effects on the vehicle structure and electronics (e.g., guidance systems and sensors). Also, the larger these valves are, the slower the response, and correspondingly, the less accurate.

The vibrational effects discussed above will be discussed in more detail with respect to pulse width modulation and a two-nozzle system for purposes of example. One nozzle is closed, while the other is open so that a fixed thrust exits only one nozzle at any time. In this example, 100 lbs. of thrust will be used as the amount alternately exiting the nozzles. Thus, one nozzle is turned on and 100 lbs. of thrust exits in one direction; the other nozzle is off. Nozzle actuation-deactuation (on-off) can be alternated very fast. For example, one nozzle can be on for two milliseconds while the other is off. Then the other nozzle turned on for four milliseconds while the first is off. The first nozzle turned on again for two milliseconds while the second nozzle is off and those positions alternated after two milliseconds and where the second nozzle is held on for four milliseconds while the first is off and so forth. It is so fast that the body inertia of the vehicle integrates out this system thrust pulsing and it appears that only 50 lbs. thrust in one direction is applied, i.e., a thrust differential. The thrust differential can be changed by changing the time intervals discussed above. Among the drawbacks of this bang-bang (on-off) system is that the shaking or pulsing, caused by the rapidly alternating thrusts, jitters the whole body of the vehicle and adversely affects its sensors and structural integrity. That is, the constant shaking the vehicle body does generally two things. First of all, it puts a buzz into the sensors. The sensor is being jittered so the sensor loses some of its resolution. In addition, since the vehicle is being jittered at a given frequency, mechanical resonances can be put into the vehicle body and can cause structural damage. Thus, you have to design the system so that the resonance (natural frequency) of the vehicle body is different than the frequency that the pulsing system will operate. Otherwise substantial structural damage can result. Thus, there is a need to provide a highly responsive thrust control system that provides a wider range of thrust capability.

SUMMARY OF THE INVENTION

The present invention is directed to a multiple nozzle propulsion control system that avoids the problems and disadvantages of the prior art. The invention accomplishes this goal by providing a rocket motor assembly including multiple pintle nozzles and a controller for adjusting the pintle position of the nozzles (or both nozzles when the assembly is a dual thruster assembly) to generate a thrust differential, while maintaining the combustion pressure at equilibrium pressure by maintaining the sum of the throat areas of all the pintle nozzles (system throat area) constant, for example. In this manner, proportional thrust control is achieved and thrust pulsing schemes which induce undesirable vibration into the system are eliminated. In addition, since the combustion chamber pressure is maintained at about equilibrium pressure, a highly responsive system results as the thrust is decoupled from combustion chamber pressure rise and dump times.

An important aspect of the controller is the provision of a pressure correction circuit. This circuit senses the actual pressure in the combustion chamber and compares that pressure with the desired equilibrium pressure upon which the pintle displacement to yield the desired thrust differential was based. That difference is converted to an error value which is equally applied among all of the nozzles to compensate for motor dynamics and maintain the combustion chamber pressure at equilibrium. The equal distribution of error ensures equal linear displacement of the two pintles so that the system pressure (operating pressure) and thrust are maintained in a manner that does not affect the target differential thrust. Otherwise, a different differential thrust would result causing vehicle acceleration to be off target. Since $P_c$ (chamber pressure) remains constant and is the equilibrium pressure, the response time for the thrust to change in response to the $\Delta$ thrust command essentially corresponds to the time it takes the actuator to move the pintle to the desired position.

Thrust shut-off by propellant extinguishment has also been demonstrated with the present invention by (1) opening the nozzle throats at high rates to rapidly decrease pressure and pull the flame front from the propellant burning surface (P-dot or differential pressure extinguishment), or (2) enlarging the throat area enough to the drop the chamber pressure low enough not to support combustion (L* extinguishment). Reignition of the motor can be achieved by repositioning the pintles to establish a pressure that can sustain system combustion and firing a conventional ignitor in the chamber.

The ability to rapidly, proportionally and accurately control thrust is especially important for escape systems such as ejection seats. Next generation ejection seats must use controllable propulsion systems to provide safe ejection over the expanded aircraft flight performance envelope of modern aircraft. To achieve substantial increases in the ejection envelope under high airspeed conditions and adverse attitudes, it is necessary to control escape propulsion thrust level and thrust vector to maintain safe trajectories for the crew member during the escape sequence.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

The present invention involves proportional control of the total thrust generated by a multiple nozzle propulsion system. An important feature of the invention is that each nozzle includes means for linearly adjusting the throat area of the nozzle. In the preferred embodiment, each nozzle is a pintle nozzle where a pintle is displaced in the nozzle throat to linearly change the throat area (i.e., the minimum annular area between the pintle and nozzle insert) to proportionally control thrust. The effect of a change in throat size differs between single and multiple pintle nozzle systems as discussed below.

Pintle controllable thrust technology involves control of the nozzle throat flow area for a solid propellant rocket motor. Solid rocket motor performance is influenced by the propellant grain surface geometry, propellant burning rate as a function of chamber pressure, and nozzle throat area. By positioning a movable probe or "pintle" in the nozzle throat, the mass flow rate of the rocket motor can be regulated.

When the throat area of a single nozzle motor decreases due to repositioning of the pintle, it causes the rocket thrust to increase. Reduction of the throat area changes the mass flow rate through the nozzle, and forces the chamber pressure to increase. Since the propellant burning rate behavior is a function of the chamber pressure raised to the exponent, n, (a propellant burning rate characteristic<1.0) any increase in pressure also increases the propellant burning rate. The resulting pressure increase is proportionately larger than the decrease in throat area, so that the effect is a thrust increase. Conversely, enlarging the nozzle throat causes the thrust to decrease.

The propulsion system of the present invention operates multiple pintle nozzles at a constant pressure and diverts gas flow between multiple nozzles through offsetting movement of the pintles to generate a thrust differential. This enables the thrust of individual nozzles to be changed, while maintaining a constant sum of nozzle throat areas and, thus, constant chamber pressure. Therefore, the relationship between changing throat area and thrust, for a single nozzle, is opposite to that described above for a single pintle nozzle rocket motor. That is, in a two nozzle arrangement (See, e.g., FIG. 5) when the throat area of one nozzle is reduced to reduce thrust, the throat area of the other nozzle is increased to increase its thrust. If the system throat area (the sum of all of the throat areas in a multiple nozzle system) is changed, then the system or total thrust changes in a manner similar to a single nozzle system.

Referring to the drawings in detail, where like numerals indicate like elements, multiple nozzle propulsion control systems are shown in accordance with the principles of the present invention. As will be apparent from the following, the proportional thrust control system provides both thrust level selection and thrust vector control. Although the propulsion control systems are illustrated in conjunction with a main rocket propulsion subsystem and an ejection seat, the present invention is not intended to be limited to those applications.

Figure 1:
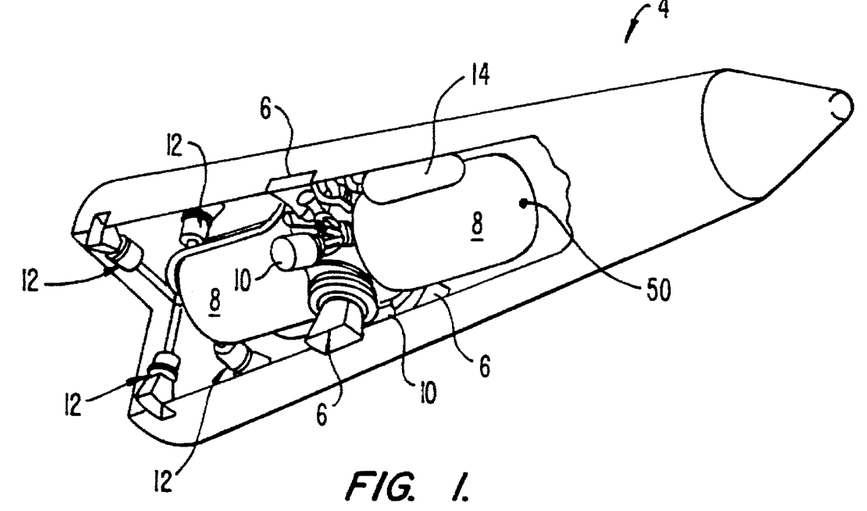
FIG. 1 is a partial section of an aerospace vehicle having a reaction jet control system in accordance with the present invention.

Referring to FIG. 1, four nozzle reaction jet assembly 2 constructed in accordance with the principles of the present invention is shown in conjunction with aerospace vehicle 4. Reaction jet or nozzle assembly 2 generally comprises a plurality of pintle nozzle assemblies 6 which are operated off of a common chamber defined by motor casing 8 which is filled with propellant. The propellant can be selected from any of a number of well-known solid propellants having the required properties for their intended mission (such as high energy CLO propellant grain). Actuator assemblies 10 adjust the position of the pintles 16 in pintle nozzle assemblies 6 to provide a wide range of thrust and maintain a constant pressure in the motor chamber as will be discussed in more detail below. Aerospace vehicle 4 also is shown with a conventional attitude control system (ACS) which includes ACS nozzle/valve assemblies 12 and ACS gas generators 14 (one being hidden from view).

Figure 2:
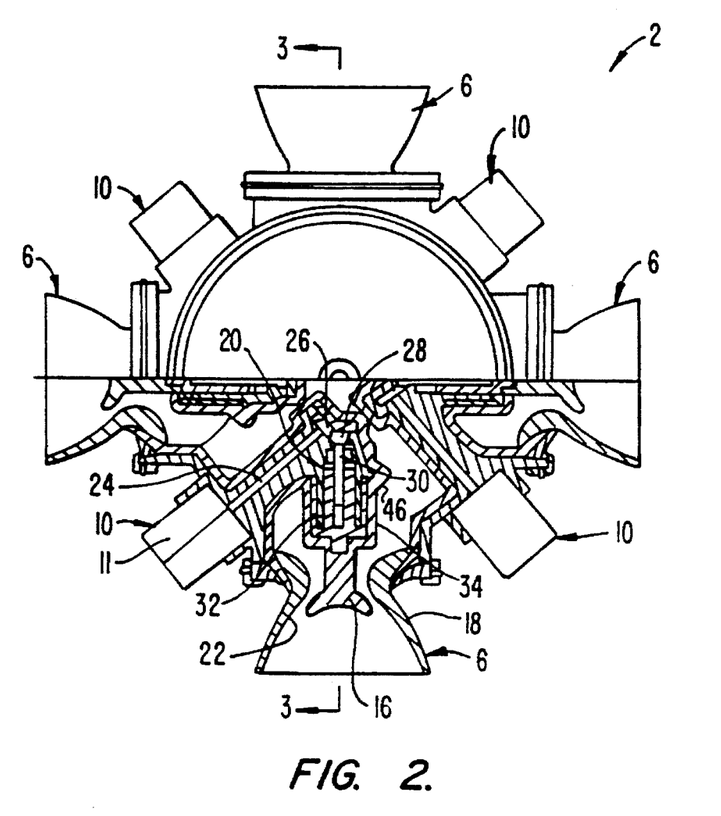
FIG. 2 is a partial sectional view of the rocket motor assembly of the reaction jet control system of FIG. 1.

Referring to FIG. 2, an end view of the multiple nozzle reaction jet assembly 2 is shown in partial section. As can be seen, nozzle assemblies 6 are oriented in a cruciform configuration. However, the nozzle assemblies can be oriented in any manner consistent with controlling the motion of the vehicle. Since each nozzle and actuator assembly are identical in construction, description of one nozzle and actuator assembly combination will be made for purposes of simplification. Referring to the lowermost nozzle assembly 6, assembly 6 includes a supersonic pintle 16 and an exit cone 18 contoured to maximum jet interaction as would be apparent to one of ordinary skill. Actuator assembly 10 generally includes motor 11, ball screw 20 coupled to a respective pintle and a conventional linear variable differential transformer (LVDT) (not shown) for translating an input voltage into mechanical position so that the pintle can be translated by a predetermined value. That is, pintle 16 is moved within nozzle assembly 6 via ball screw 20, which is actuated by actuator 10, to change the throat area of the nozzle assembly. The throat area is defined as the minimum annular area between the pintle and nozzle insert 22. Motor 11 which is controlled by a computer control system, discussed below, can be electric, hydraulic or pneumatic. In either case, the motor rotates an output shaft 24. Output shaft 24 is coupled to the input of conventional ball screw 20 through bevel gears 26 and 28. Bevel gear 28 rotates ball screw shaft 30 which linearly moves threaded nut 32 through a plurality of balls cooperatively associating the ball nut 32 with grooves formed in the ball screw shaft 30 as is conventional to translate pintle 16. Flange member 34 houses the ball nut 32 and provides for the translation of the ball nut 32 and pintle 16 as is conventional.

Figure 3:
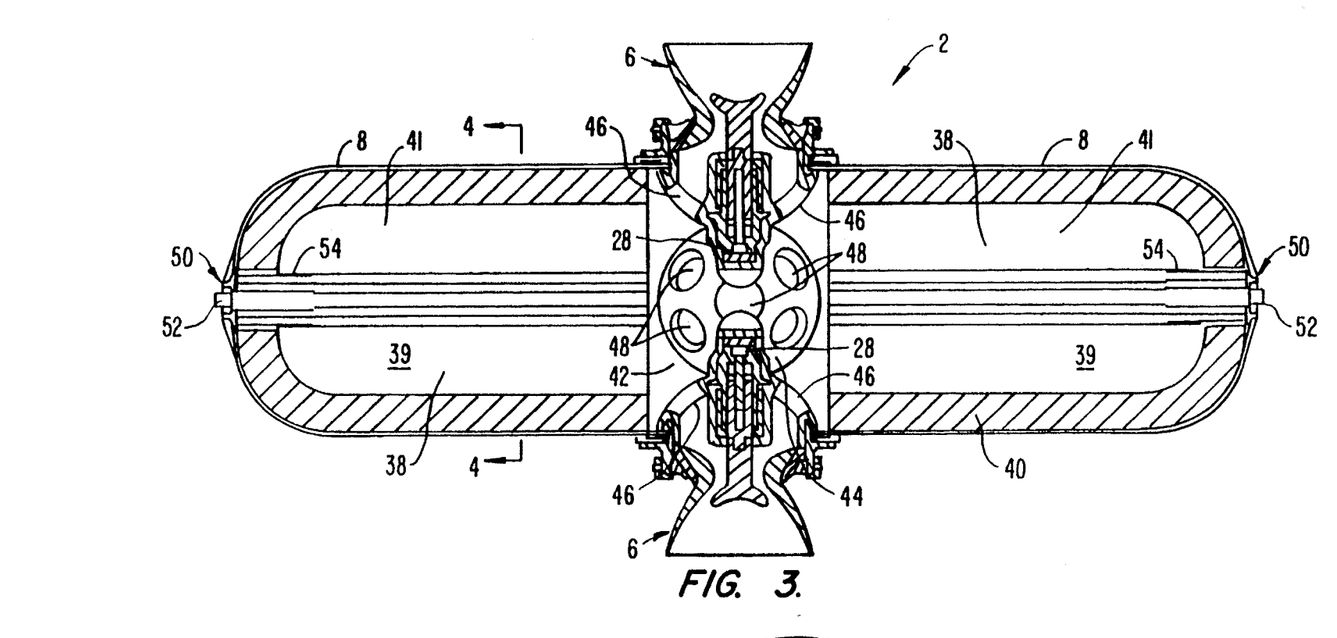
FIG. 3 is a sectional view taken along line 3—3 in FIG. 2.
Figure 4:
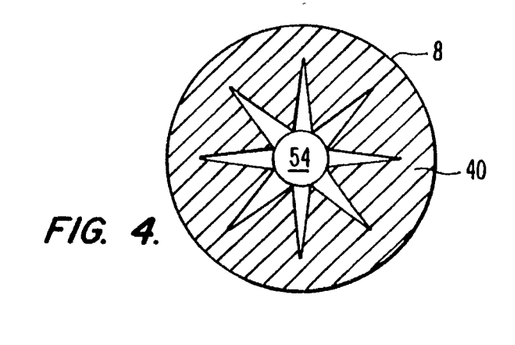
FIG. 4 is a sectional view taken along line 4—4 in FIG. 3.

Referring to FIG. 3, motor casing 8, which is a high performance composite case, comprising conventional material, defines combustion chamber 38 which comprises two laterally spaced areas 41 filled with propellant grain 40 (which preferably are high energy solid propellant grains)

and central section 42 which has no propellant. Central section 42 is fluidly coupled to lateral areas 41 and nozzle assemblies 6. Although the grain shape can vary according to the desired burn characteristics, a star shaped propellant grain is shown in FIGS. 3 and 4 for exemplary purposes. A nozzle support member 44 is secured to motor casing 8 within central section 42 for fixedly securing the end of each nozzle assembly comprising the ball screw so that the pintle is not angularly changed when pressure is generated in combustion chamber 38. To ensure that the pressurized gas generated from burning of the propellant is not obstructed from entering the nozzle assemblies through nozzle assembly ports 46, spherical nozzle support member 44 is provided with a plurality of openings 48 that provide fluid communication between the lateral and central sections 41,42 of combustion chamber 38.

Rocket motor assembly 2 also includes an ignitor which may be any of several well-known ignitors, e.g., electrically ignited explosive fuse or magnesium wires with pyrotechnic compositions. For purposes of illustration, a conventional multi-pulse ignition system 50 is shown at each end of the rocket motor assembly. Each ignition system 50 includes a squib 52 and an ignitor 54 which can provide as many as 20 pulses or ignitions, for example.

Figure 5:
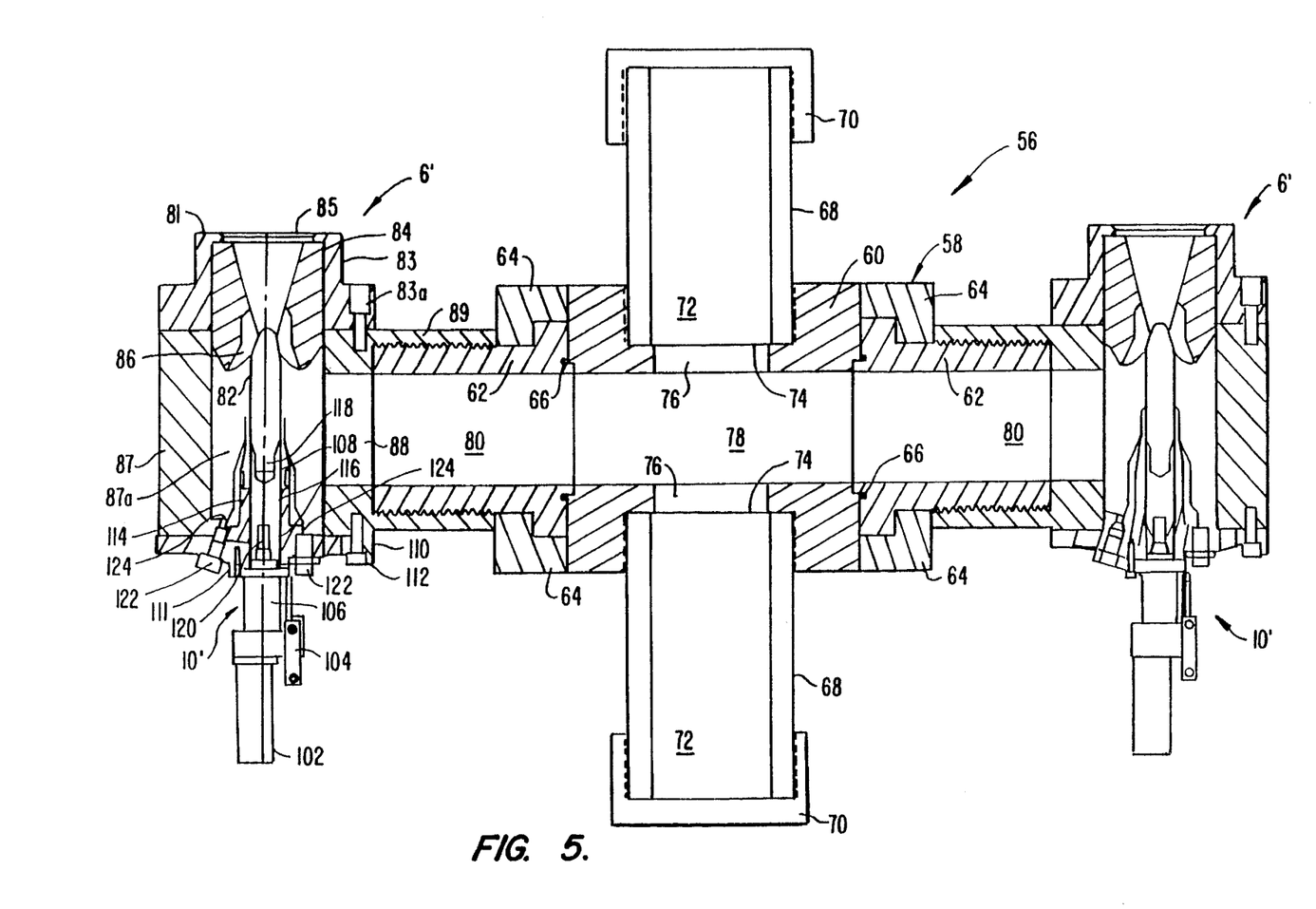
FIG. 5 is a longitudinal section of dual rocket motor assembly constructed in accordance with the present invention.

Referring to FIG. 5, a two nozzle reaction jet assembly (dual thruster motor) 56 is shown. Dual thruster motor 56 generally includes motor casing 58 and nozzle assemblies 6'. Motor casing 58 comprises central cylindrical member 60 and a pair of flanged tubes 62 coupled to central cylindrical member 60 via holding ring 64 in a way conventional to one skilled in the art. An O-ring 66 is positioned between each flanged tube 62 and central cylindrical member 60 to seal the connection therebetween. Motor casing 58 also includes propellant tube bodies 68 each having an end cap 70 secured to one end thereof by threading, for example. Each propellant tube body is filled with propellant grain 72, which can be in the configuration of a solid tube, for example, having an initial burn surface indicated by reference numeral 74. Bores 76 fluidly couple the propellant within tube bodies 68 with the interior space 78 of hollow cylindrical member 60 and interior spaces 80 hollow tubes 62. As shown, the interior areas 78 and 80 are axially aligned. Thus, as the propellant burns, a portion of the interior of propellant tube bodies 68, bores 76, interior areas 78 and 80 and the interior space 87a defined by the nozzle assemblies 6' define the combustion chamber.

Nozzle assemblies 6' are identical as well as actuator assemblies 10'. Accordingly, description of only one nozzle and actuator assembly pair will be made for purposes of simplification. Nozzle assembly 6' generally comprises nozzle element 81 and pintle 82 which is movable within the throat of nozzle element 81 to change the throat area as will be described in more detail below. Nozzle element 81 includes annular steel housing 83 and insulator 84, preferably comprises carbon phenolic material. Insulator 84 is configured to form the diverging portion of the nozzle which is in fluid communication with discharge opening 85 of the annular steel housing 83. The throat of the nozzle is defined as the smallest annular area between throat insert 86 and pintle 82. The pintles are shown in the fully closed, zero throat area position. Insert 86 comprises a thermally resistant material such as molybdenum, tungsten, or graphite, for example. Annular steel housing 85 is secured to hollow cylindrical member 87 via fasteners such as fasteners 83a. Member 87 defines an interior space 87a which is fluidly coupled to interior space 80 via bore 88 formed through the wall of member 87. Cylindrical member 87 further includes a cylindrical threaded flange 89 for coupling the nozzle and actuator assembly to the threaded end of flanged tube 62.

Actuator assembly 10' is coupled to pintle 82 for reciprocation of pintle 82 in response to displacement commands discussed in more detail below. Actuator assembly 10' generally comprises electric motor 102, linear variable differential transformer 104, ball screw 106 (for converting rotational motion to linear motion), and coupling member 108 which couples the ball screw to the pintle. A suitable actuator assembly is commercially available from Textron, Inc., Ca under model no. X410103070, for example.

The actuator assembly is secured to end cap or ring 110 via fasteners 111 (only one is shown as the others are hidden from view). End cap 110 is secured to cylindrical member 87 via fastener(s) 112, for example. End cap 110 further includes an elongated collar which extends from the ball screw to the pintle and houses coupling member 108. O-rings 116 are disposed between collar 114 and coupling member 108 to form a pressure tight seal therebetween. The ends of pintle 82 and ball screw 106, generally designated with reference numerals 118 and 120, respectively, can be threaded for securement into threaded recesses formed in respective ends of coupling member 108 as shown. Pressure sensors or transducers 122 are positioned in end cap or end ring 110 and communicate with the combustion chamber of the rocket motor assembly via pressure tap holes 124.

In either rocket motor assembly described, it is important to maintain equilibrium conditions to achieve desired control. At equilibrium, the mass flow rate coming off the propellant grain is equal to the sum of the mass flow rates exiting through the nozzles. Thus, in order to maintain the desired constant pressure control, the sum of the throat areas is maintained constant. If it is not maintained constant, the combustion chamber pressure changes from desired equilibrium control pressure. This is because the mass flow rate coming off the propellant grain changes when the pressure in the combustion chamber changes. A change in the throat area of only one nozzle, which causes a pressure change in the combustion chamber, causes the mass flow rate coming off the propellant grain to change. As a result, the system will leave the desired equilibrium control pressure if the throat area of only one nozzle were changed. What happens is that the pressure in the combustion chamber changes until it reaches a pressure where the mass flow rate coming off the propellant grain equals the sum of the mass flow rates exiting through the nozzles. The time it takes for the chamber to reach the equilibrium pressure when the nozzle throat area is changed is called the fill or dump time. For example, when the throat area of one of the nozzles is reduced, the pressure inside the combustion chamber begins to build. As the pressure builds, more mass flow comes off of the propellant grain until equilibrium is reached where the mass flow rate coming off the propellant grain is equal to the sum of the mass flow rates exiting through the nozzles.

According to the present invention, a constant pressure is maintained within the combustion chamber by maintaining the pintle nozzle throat areas summed to a constant value (this throat area sum is called the system throat area) which is selected to maintain equilibrium control pressure within the combustion chamber. To increase the thrust in a desired plane, for example, the throat areas of the nozzles in that plane (e.g., opposing nozzles illustrated in the nozzle arrangement depicted in FIG. 2) are changed by equal amounts, but in opposite directions, thereby maintaining the system throat area constant. Thus, if 1,000 lbs. of thrust were coming out of each of the four nozzles (4,000 lbs. of total system thrust) and acceleration in a direction along a plane defined by two of the nozzles corresponding to 1,000 lbs. of thrust where desired, the throat area of one of the nozzles would be increased to produce an additional 500 lbs. thrust and the nozzle opposite thereto would have its throat area decreased to decrease its thrust output by 500 lbs. The thrust differential ($\Delta T$) is then 1,000 lbs. Since the sum of the throat areas is maintained at a constant the equilibrium pressure within the chamber is maintained, thereby eliminating fill or dump times which would otherwise substantially reduce the response time to the command to accelerate the vehicle. That is, the constant pressure/constant total throat area profile decouples the nozzle thrust response from the free volume fill and dump effects of the chamber. Thus, the response time for the thrust to change in response to a delta ($\Delta$) thrust command essentially corresponds to the time it takes the actuator to move the pintle to the desired position. That is, the response time essentially only is limited to the time it takes the actuator to move the pintle.

The actuators' and, thus, the pintles' positions are controlled by a central processing unit or a processor coupled thereto. For purposes of clarity, the control circuit will be referred to as a processor. The processor also accounts for pressure changes within the combustion chamber which are attributed to varying combustion dynamics and other errors attributed to the actuator position, pintle erosion and thermal growth, throat erosions and all mechanical design and assembly tolerances. That is, a pressure feedback loop is also used to control the system pressure. The feedback system detects any difference that may exist between the actual chamber and the desired equilibrium pressure. That detected value is converted into a correction value corresponding to the necessary change in pintle position to return to the desired equilibrium control pressure. That correction value is equally distributed among all of the nozzles so that each pintle is moved the same amount and in the same direction so that the vehicle acceleration is not altered. The control system will be described with reference to the block diagram illustrated in FIG. 6 which incorporates a two-nozzle motor assembly such as that illustrated in FIG. 5.

Figure 6:
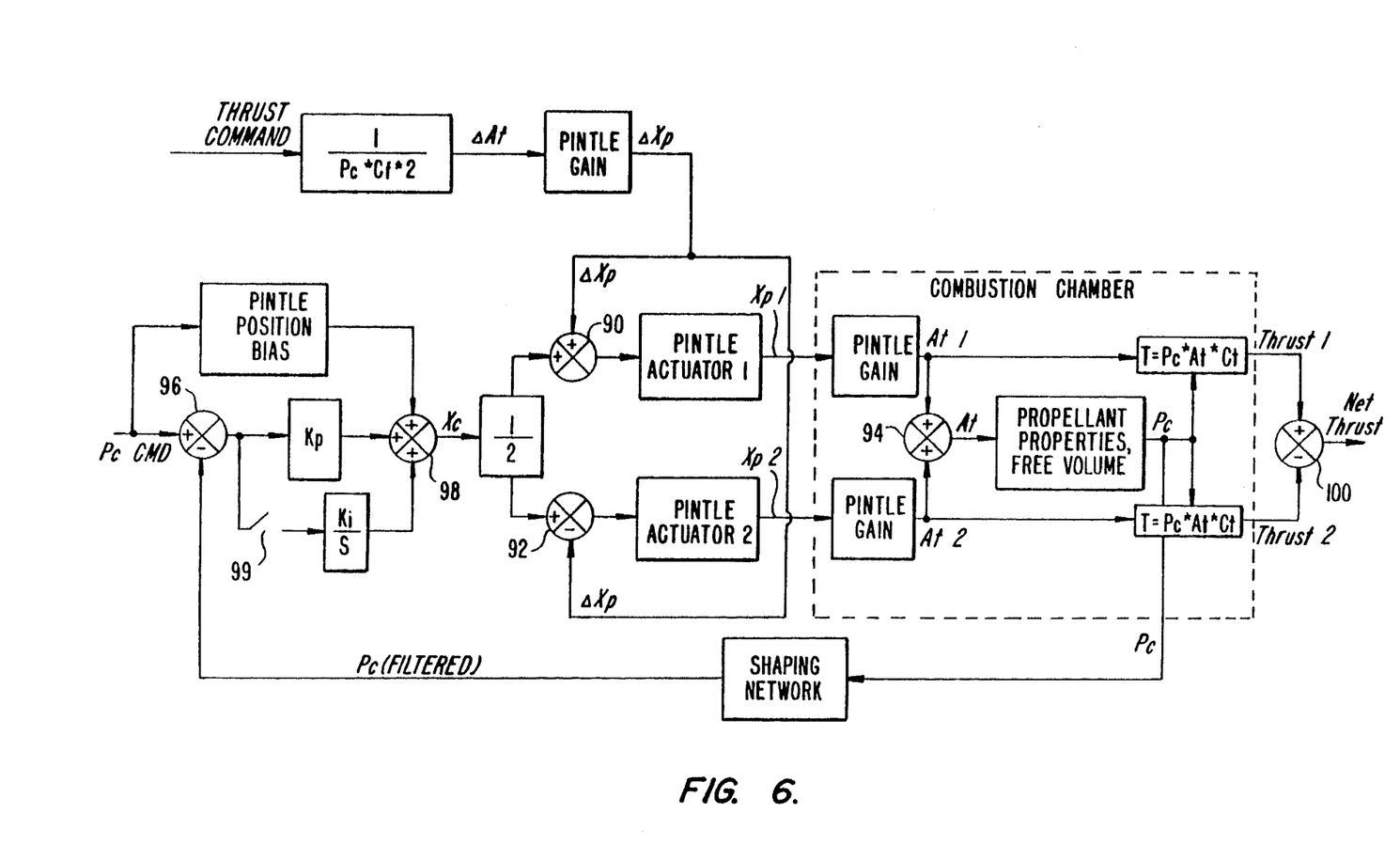
FIG. 6 is a block diagram of a control system for controlling the position of a pair of valve assemblies according to the present invention.

First, equilibrium control pressure is established in the rocket motor with both nozzles partially opened during the ignition process. A control system on-board computer, for example, determines the acceleration needed in a certain plane and translates that value to a thrust differential ($\Delta T$) needed. Thus, if 2,000 lbs. thrust were required in one direction (the $\Delta T$) the throat areas of the nozzles directed in opposite directions would be changed so that the thrust in one would be increased by 1,000 lbs. and the thrust in the other would be decreased by 1,000 lbs. The required total change in throat area, for each individual nozzle, is calculated according to the following equation.

$$\left( \frac{1}{P_c * Cf^{*2}} \right) \Delta T$$

$P_c$=Equilibrium chamber pressure upon which the desired $\Delta T$ is based.
Cf=nozzle thrust coefficient The nozzle pintle position $\Delta Xp$ command (the amount that the individual nozzle pintle positions must change to achieve the calculated $\Delta At$) is obtained by multiplying the $\Delta At$ by the theoretical pintle gain term (the theoretical pintle gain is the relationship of the change in throat area per change in pintle position). A positive $\Delta Xp$ command is then input to summer block 90 and a negative $\Delta Xp$ command is input into summer block 92 for input into pintle actuators 1 and 2, respectively.

However, due to nonlinearities in the system or errors, a pressure feedback loop is used to continuously correct (e.g., every 2 milliseconds) the pintle positions for combustion chamber pressure changes. Thus, the pressure feedback loop also corrects the $\Delta Xp$ commands discussed above. For example, equal but opposite displacement of the pintles will result in some pressure differential in the chamber due to local responses to those changes. Thus, the actual pressure in the combustion chamber is monitored so it can be compared to the desired equilibrium pressure and the pintles appropriately moved in response to that difference (as theoretically or mathematically represented by the circuit where the changed throat positions At 1 and At 2 are input into a summer block which outputs a total new throat area effect on the combustion dynamics which are affected by propellant properties and free volume, for example, which determines the actual combustion pressure.) The actual chamber pressure is obtained with a pressure transducer positioned in the rocket motor chamber. The output of the pressure transducer is fed back to the processor and is used as the chamber pressure closed loop feedback parameter. However, before the pressure signal is introduced into the feedback loop, the signal can be fed through a shaping network to eliminate noise and aid in the stability as is conventional in the art. The shaping network can include a lead lag filter, a lag filter or a notch filter, for example, and the shaping network can be done in analog circuitry or it can be done digitally in the processor. The filtered actual combustion pressure $P_c$ (filtered) is then input into summer block 96 along with the intended equilibrium chamber pressure $P_c$ Cmd (shown as the pressure chamber command) where the two values are compared and pressure error calculated. Thus, in the case where the command pressure is 2,500 psi and the actual pressure in the combustion chamber is 2,400 psi, the pressure error would be 100 psi. A classical stability process is performed on this value as shown by the classical PI controller circuit where the pressure error is compensated with proportional gain Kp (in/psi) and integral gain Ki/S (in/psi/sec) and the units are converted to inches before input into summer block 98. On-off switch 99, which precedes the integral gain circuit, maintains the integral gain circuit out of the loop until the rocket motor has been ignited and has been brought up to steady state. Once the rocket motor reaches steady state, the integral gain is turned on. Generally, the proportional gain accounts for instantaneous changes, while the integral gain compensates steady state errors.

The command pressure also is input to determine the pintle system bias, i.e., the position of all of the pintles at the desired equilibrium pressure $P_c$ Cmd. This value, which is in inches, is obtained from tables available for the nozzles used. The pintle system bias provides a theoretical bias position from which the pintle positions can be corrected. Thus, the sum of the theoretical positions of the pintles at the desired equilibrium pressure $P_c$ Cmd is input into summer block 98 along with the pressure error correction value to obtain a system correction value Xc. That value is divided by the total number of pintles being repositioned (i.e., two) so that one-half of Xc is input into summer block 90 and one-half of Xc is input into summer block 92. Thus, if the actual combustion pressure were below the desired equilibrium chamber pressure, both pintles would be moved to reduce the pintle throats in both nozzles. On the other hand, if the combustion chamber pressure exceeded the desired equilibrium pressure, each pintle would be displaced by an amount Xc/2 to increase the pintle throats of both nozzles. This division process applies only to systems where all pintles, nozzles and actuators are identical. If there are any differences in pintles, nozzles or actuators between individual thrusters, a simple modification to the above process, by weighting the division of Xc applied to each nozzle would be implemented. The overall objective in either scheme is the same, that is to maintain a constant system throat area.

The equal distribution of error ensures equal linear displacement but opposite linear displacement of the two pintles so that the system pressure (operating pressure) and net thrust designated as leaving summer block 100, are maintained in a manner that does not affect the target ΔT. In the case where 4 nozzles are used, as shown in FIG. 2, the correction value Xc would be divided by 4 and each pintle adjusted by that amount.

In some applications where the system is required to provide axial thrust as well as reaction jet control, system thrust tailoring may be required, e.g. Ejection Seats. That is, in solid rockets a progressive or regressive thrust time curve is sometimes desirable, i.e., the thrust increases (progressive) or decreases (regressive) with time. This is accomplished by changing the grain surface area with time and is conventional in the art. The control system of the present invention can accommodate this while still offering high response times. If the total system throat area profile is allowed to change with time to maintain the desired equilibrium control pressure, and the some of the individual throat areas are held to that profile, then a constant pressure mode is achieved, allowing high response thrust changes in individual nozzles to occur. For example, if a regressive thrust trace is required, all of the pintles can be moving toward the throat at a specified rate to achieve the desired system thrust time curve, i.e., the system throat area decreases with time. If a rapid thrust maneuver is desired from two or more nozzles, then the pintles move individually to provide the desired thrust, as long as the system throat area (i.e., the sum of all of the nozzle throat areas) follows the desired regressive path.

Figure 7:
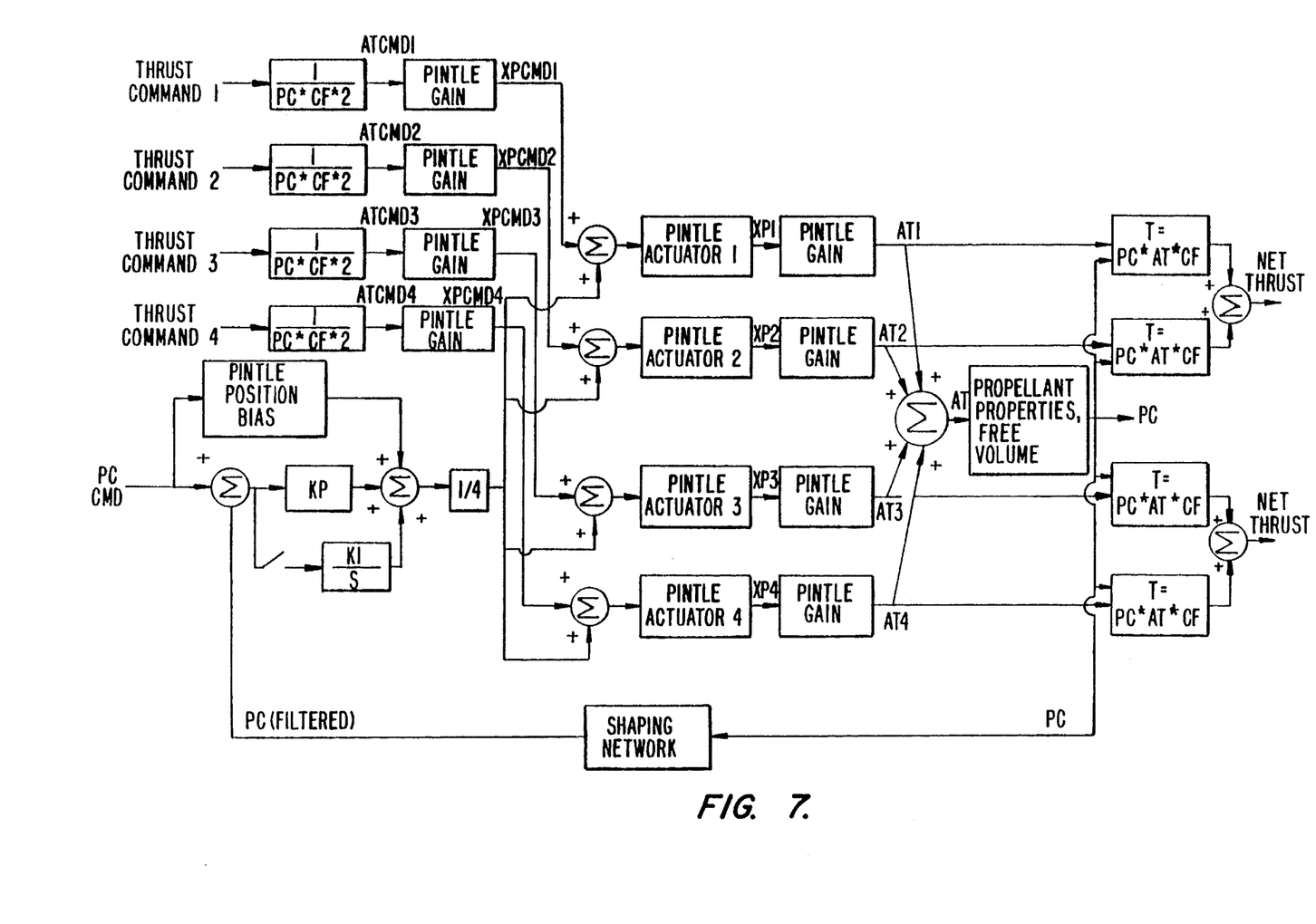
FIG. 7 is a control system block diagram generally corresponding to the block diagram of FIG. 6 expanded for four nozzles.

Referring to FIG. 7, a block diagram of a control system corresponding to that of FIG. 6 and expanded for four nozzles is shown. As apparent from the drawings, four individual thrusts can be commanded. (The command computer knows the system thrust.) In addition, depending on the application, a thrust acceleration vector can be commanded which is translated into individual thruster commands. ATCMD1 corresponds to Throat Area Command, Nozzle 1; XPCMD1 corresponds to Pintle Position Command, Nozzle 1 (D2–4 are used to distinguish nozzles 2–4) for the throat area and pintle position commands.

Figure 8:
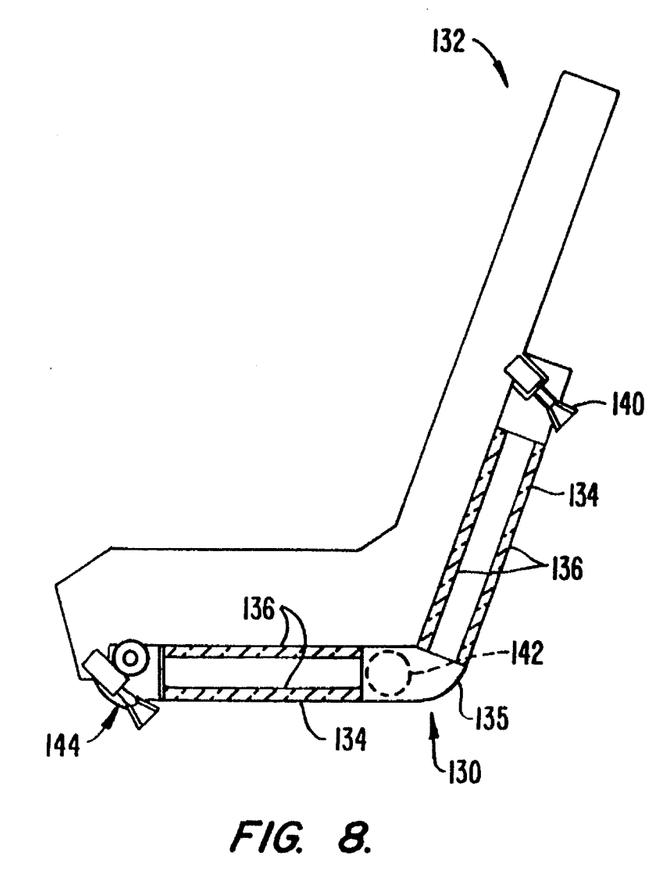
FIG. 8 is a side view of an ejection seat having a multiple pintle nozzle arrangement in accordance with the present invention.
Figure 9:
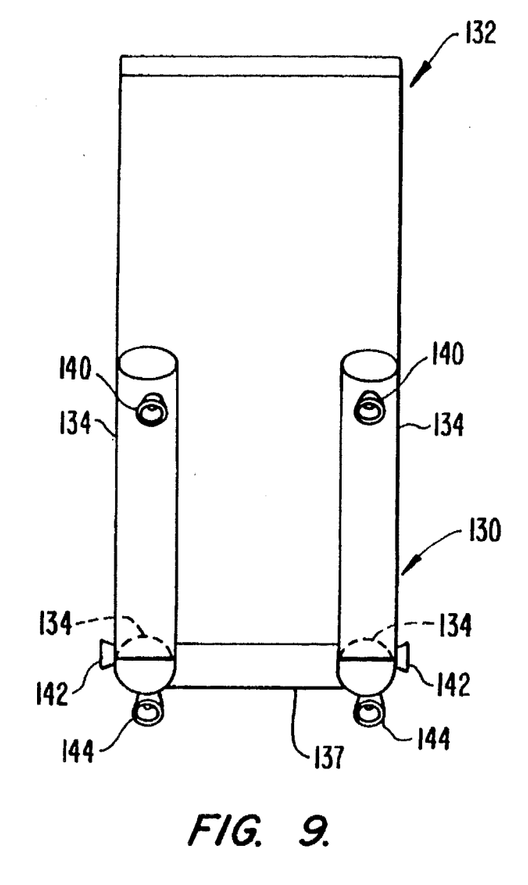
FIG. 9 is a rear view of the ejection seat shown in FIG. 8.

Referring to FIGS. 8 and 9, another nozzle reaction jet assembly constructed according to the principles of the present invention is shown. This reaction jet assembly, assembly 130, is configured to provide a propulsion system for ejection seat 132. Reaction jet assembly 130 incorporates the multiple pintle proportional control scheme discussed above.

Reaction jet assembly 130 generally comprises four solid propellant rocket motor grains, one common combustion chamber and six nozzles. Two of the propellant grains 134 are fluidly coupled at elbow 135 and positioned to one side of the seat. The other two motors are similarly coupled and positioned along the other side of the seat as shown in the drawings. A tubular crossover member 137 fluidly couples the motor pairs to form a generally H-shaped combustion chamber. The six pintle nozzle and actuator assemblies, which are schematically shown, are essentially the same as those described with reference to FIG. 5. That is, each nozzle assembly includes a nozzle and pintle movably positioned therein to change the throat area, while each actuator assembly includes a motor, LVDT and a ball screw to displace the pintle. By maintaining a constant pressure in the combustion chamber as discussed above including correcting pintle position to compensate for motor dynamics, for example, as discussed above. The nozzles can be oriented to provide a wide range of maneuverability as discussed below.

Referring to the nozzle arrangement of FIGS. 8 and 9, the upper nozzle/actuator assemblies are designated with reference numeral 140, the intermediate ones with reference numeral 142 and the lower ones with reference numeral 144. As shown in the drawings, the upper and lower nozzle pairs can be parallel to each other (e.g., oriented in one direction in the X-Z plane) so they're propelling this seat away from the aircraft and are being used as axial thrusters. The remaining two nozzles can be pointed in a direction substantially perpendicular to the other four.

A maneuver to correct the attitude of the ejection seat can be done by simply increasing the thrust of the upper two nozzles and decreasing the thrust of the lower two nozzles, while maintaining the overall throat area sum the same to maintain a constant combustion chamber pressure. Equilibrium conditions and pintle movement are accomplished as described above. Thus, a constant flight vector can be maintained, while performing attitude control. In other words, the pitch moment can be varied to counter an applied aerodynamic moment by throttling the upper or lower nozzle pairs, while simultaneously maintaining a constant net thrust through the center of gravity. This configuration achieves two simultaneous high demand ejection events: (1) ejection during high aircraft roll rates, and (2) safe ejection under maximum aircraft dynamic pressure, "q". In addition, the thrust on the ejection seat can be proportionally reduced to reduce G forces by opening nozzles 144 equally covering chamber pressure and system thrust with creating an advance moment.

In sum, the ejection seat propulsion system offers the capability to control thrust, acceleration, and onset to maintain performance within physiological limits. Temperature πk effects, crew member weight, and imposed aircraft acceleration influences also can be compensated for using the actuator regulated pintle nozzle/valve.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A method of controlling thrust in a propulsion system comprising the steps of:

providing a rocket motor having a combustion chamber and multiple nozzles each having an adjustable nozzle throat area for proportionally controlling gas discharge therefrom;

energizing the motor to cause gas to be discharged from the nozzles and generate thrust;

sensing the pressure in the combustion chamber;

comparing the sensed pressure value to a preselected pressure value; and changing the throat areas of the nozzles, each by essentially the same amount, based on the difference between the sensed and preselected values to obtain the preselected pressure value in the combustion chamber.

2. The method of claim 1 further including the step of selecting a number of the nozzles and adjusting the throat areas of those nozzles to change the relative thrust generated by those nozzles.

3. The method of claim 2 wherein the adjusting step includes adjusting the selected throat areas while maintaining the sum of all of the nozzle throat areas essentially constant.

4. The method of claim 1 further including providing the motor with a regressive propellant configuration and progressively reducing the sum of all of the nozzle throat areas to maintain the rocket motor pressure essentially constant.

5. A multiple nozzle propulsion system comprising:

a motor casing that forms a combustion chamber;

propellant disposed in said chamber;

multiple pintle nozzles each having a throat and a pintle movably positioned therein for changing the throat area of the nozzle, each pintle nozzle being fluidly coupled to said chamber; and means for changing the position of said pintles, each by essentially the same amount, in response to pressure changes in said chamber.

6. The system of claim 5 wherein said changing means changes the position of each of said pintles by essentially the same amount.

7. The system of claim 5 including means for maintaining the sum of all of the nozzle throat areas constant when a selected number of the nozzles are adjusted to change the relative thrust generated by the selected nozzles.

8. A method of controlling thrust in a propulsion system comprising the steps of:

(a) providing a rocket motor having a combustion chamber with multiple nozzles each having an adjustable nozzle throat area for proportionally controlling gas discharge therefrom;

(b) generating hot exhaust gases in the combustion chamber discharging gases so generated from the nozzles to generate thrust;

(c) adjusting the throat area of a number of the nozzles to generate a thrust differential, while maintaining the sum of all the nozzle throat areas essentially constant;

(d) sensing the pressure in the rocket motor combustion chamber;

(e) comparing the sensed pressure value to a preselected pressure value; and (f) changing the throat areas of the nozzles, each by essentially the same amount, based on the difference between the sensed and preselected values to obtain the preselected pressure value in the combustion chamber.

* * * * *